United States Patent [19]

Krieger

[11] Patent Number: 5,603,242
[45] Date of Patent: Feb. 18, 1997

[54] DIRECT DRIVE TRANSMISSION APPARATUS AND METHOD FOR CONTROLLING SHIFT

[75] Inventor: Jeffrey J. Krieger, Peoria, Ill.

[73] Assignee: Caterpillar Inc., Peoria, Ill.

[21] Appl. No.: 499,884

[22] Filed: Jul. 11, 1995

[51] Int. Cl.$^6$ ............................................. F16H 61/00
[52] U.S. Cl. ..................................... 74/335; 74/339
[58] Field of Search .................. 74/329, 330, 331, 74/335, 339; 477/124

[56] References Cited

U.S. PATENT DOCUMENTS

| | | | |
|---|---|---|---|
| 4,461,188 | 7/1984 | Fisher | 74/330 |
| 4,463,621 | 8/1984 | Fisher | 74/330 |
| 4,685,343 | 8/1987 | Ehrlinger et al. | 74/331 |
| 4,738,149 | 4/1988 | Janiszewski | 74/330 |
| 5,125,294 | 6/1992 | Takashi et al. | 74/866 |
| 5,259,260 | 11/1993 | Schneider | 74/331 |

*Primary Examiner*—Dirk Wright
*Attorney, Agent, or Firm*—Calvin E. Glastetter

[57] ABSTRACT

A direct drive transmission includes clutches for driving a gear box and a shift controller in providing for improving the shifting of gears within the gear box. The gear box includes a first input countershaft and a second input countershaft. The shift controller includes a motor which is connected between the input countershafts to maintain the speed of the countershafts during shifting of the gears.

6 Claims, 2 Drawing Sheets

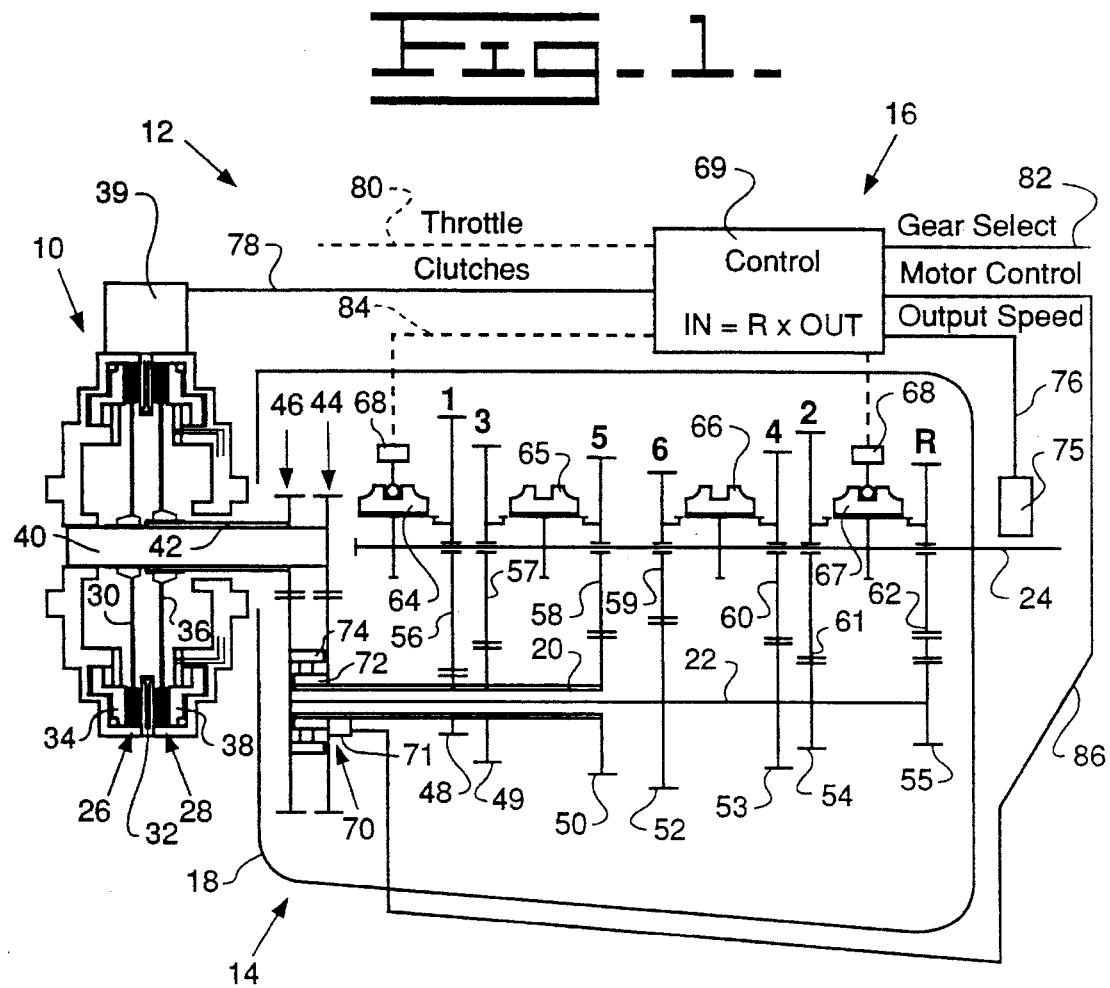

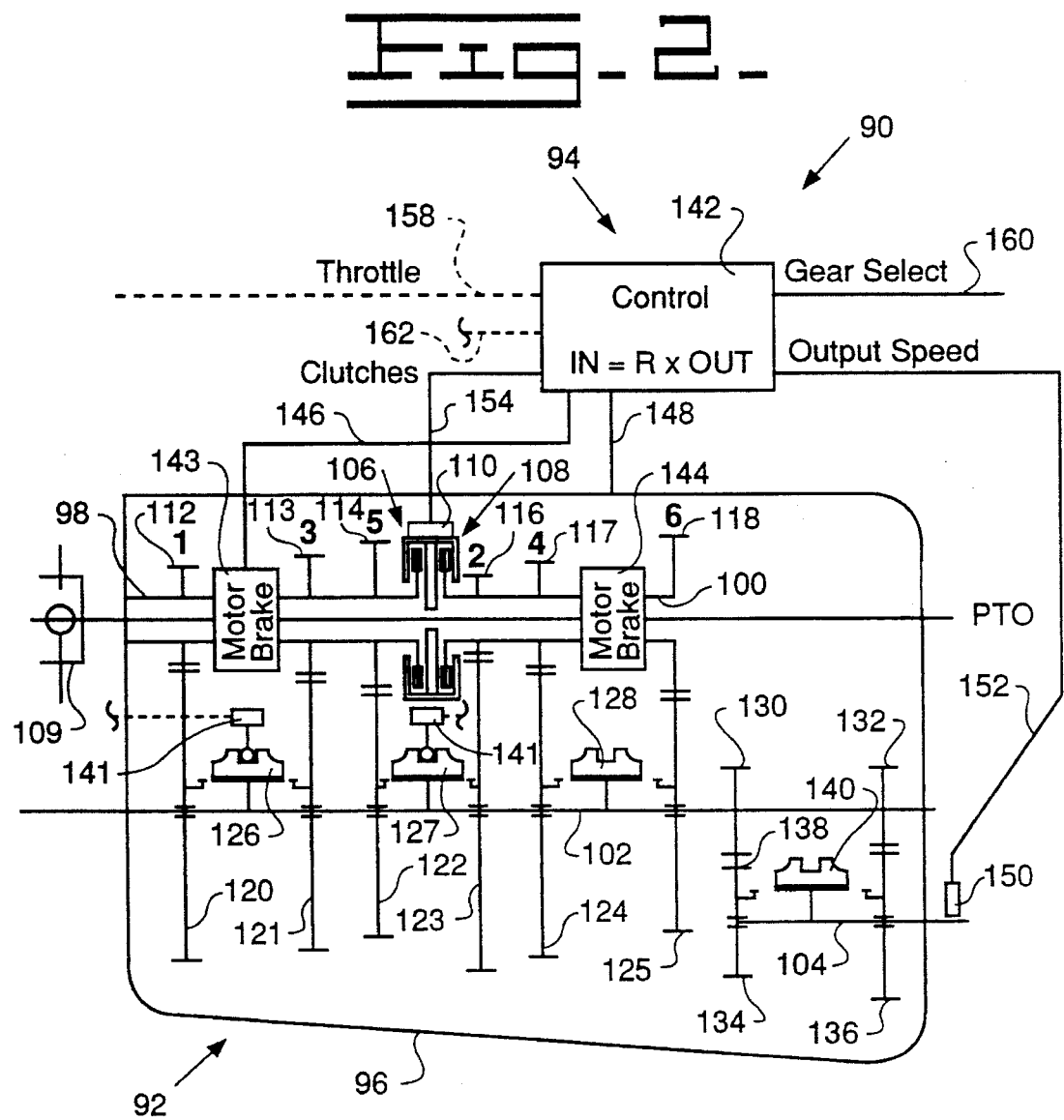

DIRECT DRIVE TRANSMISSION APPARATUS AND METHOD FOR CONTROLLING SHIFT

Technical Field

This invention relates generally to a direct drive transmission arrangement having two input shafts and more particularly to a control for matching the speed of a sliding shift collar to the speed of a respective gear to achieve a synchronized speed prior to a shift.

BACKGROUND ART

Direct drive transmissions are commonly used to provide a high efficiency advantage when propelling a machine. When larger direct drive transmissions are used they have to be double clutched to synchronize the speed of the input shaft with the sliding shift collars to permit the transmission to be shifted from one gear to another. The problem with double clutching is that it takes time and is difficult to accomplish in slow moving, high drawbar load machines, such as construction machines, without stopping or have the machine come to a stop with each shift desired.

The present invention is directed to overcome one or more of the problems as set forth above by providing uninterrupted torque to the output shaft during a shift.

DISCLOSURE OF THE INVENTION

In one aspect of the present invention a direct drive transmission and control arrangement is drivingly connected to an engine. The transmission includes a first clutch which is selectively connected to the engine and a second clutch which is selectively connected to the engine. A first countershaft is connected to the first clutch for providing an input. The first countershaft includes at least one gear mounted thereon. A second countershaft is connected to the second clutch for providing an input. The second countershaft includes at least one gear mounted thereon. A layshaft parallel to the first and second countershafts provides an output. The layshaft includes at least two gears mounted thereto. One of the gears is enmeshable with the gear on the first countershaft and the other gear is enmeshable with the gear on the second countershaft. A shift collar is moveable into engagement with one of the gears for conveying torque in the countershafts into the lay shaft. Means is provided for changing the speed of the countershafts and shift collar so that the speed of the shift collar matches the speed of the respective gear.

The present invention provides a direct drive transmission which synchronizes the speed of the shift collar with a respective gear to improve transmission shift. The arrangement includes means connected to the countershafts which will speedup or slow down the countershafts and shift collar to match the speed of the respective gear.

BRIEF DESCRIPTION OF THE DRAWINGS

FIG. 1 is a diagrammatic view of a direct drive transmission and controller of the present invention.

FIG. 2 is a diagrammatic view of an alternate embodiment of a direct drive transmission and controller.

BEST MODE FOR CARRYING OUT THE INVENTION

Referring to FIG. 1, an engine flywheel 10 is drivingly connected to a transmission arrangement 12. The transmission arrangement 12 includes a direct drive gear box arrangement 14 and a control means arrangement 16. The gear box arrangement 14 has a housing 18, a first input countershaft 20, a second input countershaft 22 and a layshaft 24 which provides an output.

A first clutch 26 and a second clutch 28 are selectively connected to the engine flywheel 10. The first clutch 26 includes a first clutch disk 30, a reaction plate 32 attached to the engine flywheel 10 and a pressure piston 34. The second clutch 28 includes a second clutch disk 36, the reaction plate 32 and a pressure piston 38. A control valve 39 is provided to actuate the clutches 26, 28. A first input shaft 40 is connected to the first clutch disk 30. A second input shaft 42, in the form of a hollow shaft journaled concentrically with the first input shaft 40, is connected to the second clutch disk 36.

A first gear set 44 drivingly connects the first shaft 40 to the first countershaft 20. A second gear set 46 drivingly connects the second shaft 42 to the second countershaft 22. The first countershaft 20, in the form of a hollow shaft journaled concentrically with the second countershaft 22, carries a plurality of gears 48–50 respectively for first, third and fifth speeds respectively. The second counter shaft 22 carries a plurality of gears 52–55 respectively for sixth, fourth, second speeds and reverse respectively.

The layshaft 24 is journaled in the gear box housing 18 in a plane spaced from the countershafts 20, 22. The layshaft 24 carries a plurality of freely rotatably journaled gears 56–62 which are enmeshable with the gears 48–50 and the gears 52–55 on the countershafts 20, 22. The gears 56–62 are alternately lockable to the layshaft 24, to provide various transmission speeds, by a plurality of sliding shift collars 64–67 which are axially displaceable but non-rotatable relative to the layshaft 24. The shift collars 64–67 can be moved into engagement with a gear by any suitable means such as an electronic shift 10 controller 68 connected to each shift collar, hydraulic actuator or by any other suitable means without departing from the scope of the invention.

The control means arrangement 16 includes a controller 69 for controlling the gear box arrangement 14. A rotatable fluid motor 70 is connected between the first countershaft 20 and the second countershaft 22. The motor 70 includes a motor controller 71. In this application the motor 70 is shown as a conventional gear motor, however any suitable motor such as a vane motor or an electric motor may be used without departing from the invention. The motor includes a drive unit 72 and a driven unit 74. The drive unit 72 is drivingly connected to the first countershaft 20 and the driven unit 74 is connected to the second countershaft 22. The motor connected between the countershafts will provide power to maintain the relative speed between the countershafts during a shift. A signal from a speed sensor 75 on the output layshaft 24 is sent to the controller 69 through a line 76. A signal is sent to control valve 39 of the clutches 26,28 from the controller 69 through line 78. A throttle position or engine speed signal is sent to the controller 69 through line 80. A gear selection signal is sent to the controller 69 through line 82. A signal is sent from the controller 69 to the shift controller 68 through a line 84. A signal is sent from the controller 69 to the motor controller 71 through a line 86.

Now referring to FIG. 2, an alternate embodiment of a transmission arrangement 90 is shown. The transmission arrangement 90 includes a direct drive gear box arrangement 92 and a control means arrangement 94. The gear box arrangement 92 has a housing 96, a first input countershaft 98, a second input countershaft 100, a layshaft 102 and an output shaft 104.

A first clutch 106 and a second clutch 108 are selectively connected to a source of power such as an engine flywheel 109 through the PTO shaft. A control valve 110 is provided for activating the clutches 106, 108. The first clutch 106 selectively connects the first input countershaft 98 to the flywheel 109. The first countershaft 98 carriers a plurality of gears 112–114 respectively for first, third and fifth speeds respectively. The second clutch 108 selectively connects the second input countershaft 100 to the flywheel 109. The second countershaft 100 carriers a plurality of gears 116–118 respectively for second, fourth and sixth speeds respectively.

The layshaft 102 is journaled in the gear box housing 96 in a plane spaced from the countershafts 98, 100. The layshaft 102 carriers a plurality of freely rotatably journaled gears 120–125 which are enmeshable with the gears 112–114 and the gears 116–118 on the countershafts 98,100. The gears 120–125 are alternately lockable to the layshaft 102, to provide various transmission speeds, by a plurality of sliding shift collars 126–128 which are axially displaceable but non-rotatable relative to the layshaft 102. The layshaft 102 also carries a reverse gear 130 and a forward gear 132.

The output shaft 104 is journaled in the gear box housing 96 in a plane spaced from the layshaft 102. The output shaft 104 carriers a pair of freely rotatably journaled output gears 134, 136. The output gear 134 is connected to the reverse gear 130 by an idler gear 138 to provide reverse output. The output gear 136 is directly enmeshable with the forward gear 132. The gears 134, 136 are alternately lockable to the output shaft 104 by a sliding shift collar 140 which is axially displaceable but nonrotatable relative to the output shaft 104. The shift collars can be moved into engagement with a gear by any suitable means such as an electronic shift controller 141 connected to each shift collar, hydraulic actuator or any other suitable means without departing from the scope of the invention.

The control means arrangement 94 includes a controller 142 for controlling the gear box arrangement 92. A first motor 143 is connected to the first input countershaft 98 and a second motor 144 is connected to the second input countershaft 100. The motors 143, 144 are used to bring the countershaft to a speed which matches the speed of the selected gear and shift collar before a shift. The motors can be any suitable motor which can be controlled for increasing or decreasing the speed of the input countershaft, such as a variable displacement hydraulic motor or an electric motor, without departing from the scope of the invention. A signal for controlling the first motor 143 is sent from the controller 142 through a line 146. A signal for controlling the second motor 144 is sent from the controller 142 through a line 148. A signal of the speed of the output shaft 104 is sent from a speed sensor 150 to the controller 142 through a line 152. A signal is sent to the control valve 110 for controlling the first clutch 106 and the second clutch 108 from the controller 142 through a line 154. A throttle position or machine speed signal is sent to the controller 142 through a line 158. A gear selection signal is sent to the controller 142 through a line 160. A signal is sent from the controller 142 to the shift controller 141 trough a line 162.

INDUSTRIAL APPLICABILITY

In use of the present arrangements shown in FIG. 1, the input countershafts 20, 22 of the gear box 14 are selectively drivingly connected to the engine flywheel 10 by a first clutch 26 and second clutch 28. The gears 48–50 which provide the odd numbered gear speeds are mounted on the first input countershaft 20. The gears 52–55 which provide the odd numbered gear speeds are mounted on the second input countershaft 22. The gears 48–50, 52–55 are enmeshable with the gears 56–62 on the layshaft 24. The shift collars 64–67 connect a selected gear to the layshaft 24 to transmit torque to the output.

In operation of the transmission of FIGS. 1 and 2, the controller 69, 142 receives inputs from the speed sensor 150, 75, the gear selector and the engine throttle or machine speed. After receiving the inputs the controller 69, 142 sends outputs to the clutch control valve 39, 110 for selectively engaging one of the clutches or disengaging both of the clutches. The controller 69, 142 also send outputs to the motor 70, 143 and 144 as needed to bring one or the other countershaft to a required speed to match the speed of the selected gear. To effect a shift from first speed to second speed, for instance, the operator would move the gear selector to the second position. The controller 69, 142 would sense the shift and bring the nonengaged input countershaft up to speed to match the selected gear and then send a signal to the shift controller 68, 141 to move the shift collar 67, 127 to engage the selected gear 61, 123. When the second gear is selected, the controller 69, 142 simultaneously disengages the first clutch 26, 106 and engages the second clutch 28, 108. The shift can be accomplished without an interruption in torque. The controller can be programmed to anticipate what the next shift would be by tracking the previous shift and the various inputs and have the shift collar moved before the operator selects the next gear to provide a faster shift.

In view of the forgoing, it is readily apparent that the structure of the present invention provides a direct drive transmission arrangement which will control the speed of the disengaged countershaft to match the speed of a selected gear before moving the shift collar into engagement with the selected gear. After the shift collar is engaged one clutch is disengaged while the other clutch is being engaged so that there is no interruption in torque.

Other aspects, objects and advantages of this invention can be obtained from a study of the drawings, the disclosure and the appended claims.

I claim:

1. A direct drive transmission and control arrangement adapted to be drivingly connected to an engine, comprising:

a first clutch selectively connected to the engine;

a second clutch selectively connected to the engine;

a first countershaft selectively connected to the engine by the first clutch for providing an input, the first countershaft includes at least one gear mounted thereon;

a second countershaft selectively connected to the engine by the second clutch for providing an input, the second countershaft includes at least one gear mounted thereon;

a layshaft positioned parallel to the first and second countershafts provides an output, the layshaft includes at least two gears mounted thereto one of the gears being enmeshable with the gear on the first countershaft and the other gear being enmeshable with the gear on the second countershaft;

a shift collar moveable into engagement with one of the gears for conveying torque in the countershafts into the layshaft; and means for controlling the speed of the countershaft not connected to the engine so that the speed of the shift collar matches the speed of the respective gear.

2. The direct drive transmission of claim 1, wherein the controlling means includes a motor and a controller to change the speed of the motor.

3. The direct drive transmission of claim 2, wherein the motor is connected between the first and second countershafts.

4. The direct drive transmission of claim 3, wherein the motor includes a drive unit connected to the first countershaft and a driven unit connected to the second countershaft.

5. The direct drive transmission of claim 2, wherein the motor is connected to one of the input countershafts.

6. A method for controlling the shifts of a direct drive transmission by controlling the speed of a first and second input countershaft to match the speed of a shift collar to a respective gear and engaging a clutch to one of the countershaft while disengaging a clutch from the other countershaft, comprising the steps of:

sensing the position of a throttle, the position of a gear selector to determine what gear is selected and the speed of an output shaft;

computing the sensed positions and calculating what the speed of the input shaft needs to be to match the speed of the shift collar with the speed of the selected gear;

sending a control signal to a motor for changing the speed of the motor and the respective countershaft which is disengaged from the clutch;

moving the shift collar into engagement with the selected gear; and sending a signal to a control valve to disengage the clutch associated with one of the countershafts while engaging the other clutch to power the countershaft associated with the selected gear.

\* \* \* \* \*